US012611652B2

(12) United States Patent     (10) Patent No.:   US 12,611,652 B2

Labruyere et al.            (45) Date of Patent:      Apr. 28, 2026

(54) METHOD FOR RECYCLING METALS FROM POROUS MATERIALS COMPRISING THEM

(71) Applicant: Eurecat S.A., La Voulte-sur-Rhône (FR)

(72) Inventors: Franck Labruyere, Charmes sur Rhone (FR); Pauline Galliou, Saint Laurent du Pape (FR)

(73) Assignee: EURECAT S.A., La Voulte-sur-Rhône (FR)

( * ) Notice: Subject to any disclaimer, the term of this patent is extended or adjusted under 35 U.S.C. 154(b) by 544 days.

(21) Appl. No.: 18/186,072

(22) Filed: Mar. 17, 2023

(65) Prior Publication Data

US 2023/0294074 A1     Sep. 21, 2023

(30) Foreign Application Priority Data

Mar. 18, 2022    (FR) ...................................... 2202405

(51) Int. Cl.
    *B01J 20/08*       (2006.01)
    *B01J 20/34*       (2006.01)
    *C22B 3/06*       (2006.01)

(52) U.S. Cl.
    CPC ........... *B01J 20/3433* (2013.01); *B01J 20/08* (2013.01); *B01J 20/3475* (2013.01); *B01J 20/3483* (2013.01); *C22B 3/06* (2013.01)

(58) Field of Classification Search
    CPC . B01J 20/06; B01J 20/08; B01J 20/045; B01J 20/3475; B01J 20/3483; C22B 3/06
    See application file for complete search history.

(56) References Cited

U.S. PATENT DOCUMENTS

| | | | |
|---|---|---|---|
| 4,721,606 A | 1/1988 | Tilley | |
| 4,851,380 A * | 7/1989 | Van Leirsburg | ......... B01J 29/90 |
| | | | 208/140 |
| 8,268,745 B2 * | 9/2012 | Dodwell | ............... B01J 20/106 |
| | | | 95/135 |
| 8,815,380 B1 * | 8/2014 | Nemeth | ................. C03C 15/00 |
| | | | 216/101 |
| 2010/0105540 A1 | 4/2010 | Galliou et al. | |
| 2013/0064742 A1 | 3/2013 | Thomas | |

FOREIGN PATENT DOCUMENTS

| | | | | |
|---|---|---|---|---|
| EP | 0055786 A1 * | 7/1982 | ......... | B01J 20/3475 |
| EP | 1 488 015 B1 | 10/2006 | | |

OTHER PUBLICATIONS

Meyer et al "Deactivation and regeneration of Cu/Sio2 catalyst in the hydrogenation of maleic anhydride. Kinetic modeling", Applied Catalysis A: General 367 (2009) 122-129.*

Bui et al "Maleic acid, an efficient additive for the activation of regenerated CoMo/Al2O3 hydrotreating catalysts", Journal of Catalysis 330 (2015) 374-386.*

Bui et al "Activation of regenerated CoMo/Al2O3 hydrotreating catalysts by organic additives—The particular case of maleic acid", Applied Catalysis A, General 572 (2019) 185-196.*

Preliminary Report and Written Opinion mailed Oct. 10, 2022, issued in corresponding French Application No. 2202405, filed Mar. 18, 2022, 8 pages.

* cited by examiner

*Primary Examiner* — Mark Kopec

(74) *Attorney, Agent, or Firm* — CHRISTENSEN O'CONNOR JOHNSON KINDNESS PLLC

(57)            ABSTRACT

An object of the present invention is a method for recycling a metal or several metals M selected from among those belonging to the columns 8 to 12 of the periodic table of elements, present at least partially in the form of metal sulphides in a porous material A comprising at least one mineral oxide and having a sulphur content higher than or equal to 2% by weight. Said method comprises the following successive steps:

(1) at least one step of heat treatment of the material A in the presence of oxygen, at a temperature comprised within the range from 350° C. to 900° C.;

(2) at least one step of washing the material A' derived from step (1) by means of an aqueous solvent;

(3) at least one step of extracting the metal(s) M by setting the material A" derived from step (2) in contact with a solution S containing at least one carboxylic acid; and (4) at least one step of depositing at least one portion of the metal(s) M over a porous material B different from said material A, by setting the solution S' derived from step (3) in contact with said material B.

17 Claims, No Drawings

METHOD FOR RECYCLING METALS FROM POROUS MATERIALS COMPRISING THEM

CROSS-REFERENCES TO RELATED APPLICATIONS

This application claims priority to FR 2202405, filed Mar. 18, 2022, the entire contents of which are incorporated by reference herein in their entirety.

The present invention relates to recycling of metals present in porous materials such as in particular traps and adsorbent agents used in the oil refining and petrochemicals fields.

PRIOR ART

Hydrocarbon transformation processes implement agents commonly called traps or adsorbents, which are porous materials generally in the form of particles, based on one or more refractory oxide(s) such as alumina, silica, alumino-silicates (zeolites), and which further contain a substantial amount of a metal such as nickel, copper, zinc.

These materials are used in order to trap, for example to retain by adsorption, undesirable chemical species. For example, traps are typically used in hydroprocessing reactors upstream of catalyst beds in order to trap the contaminant agents present in the petrol feedstock (including sulphur compounds, compounds containing undesirable metals such as mercury, vanadium, arsenic, . . . ) and to protect the catalyst from such contaminant agents likely to poison the catalytic sites and cause premature deactivation thereof.

Thus, these materials are intended to be contaminated by undesirable compounds in very high contents, which, at the end of the use cycle thereof, lead to spent materials that are hard to recycle and/or regenerate.

However, it becomes essential to be able to recycle the metals which are present in amounts that are often large in these materials.

The problem of recycling the metals present in catalysts is different from that one of recycling the metals present in traps and adsorbent agents, on the one hand because the metal contents is significantly higher in traps and adsorbents than in catalysts, on the other hand because the contamination level is much higher in traps and adsorbents and the nature of the contaminants is different.

Methods for recycling the metals present in the catalysts have been developed in the prior art, but these are not always effective in recycling the metals present in spent traps or adsorbents.

In the work entitled "Handbook of Spent Hydroprocessing Catalyst", Elsevier Science Ltd, 1st edition, 2010, in Chapter 11, the Authors Meena Marafi et al. describe different techniques for recovering metals from spent hydroprocessing catalysts, containing essentially alumina and metals such as molybdenum, nickel and cobalt, and possibly vanadium. The described most classical techniques are:

pyrometallurgical ways, wherein the spent catalysts are molten in a suitable furnace to separate the metals from a slag containing alumina and/or silica. Thus, recycling is done in a so-called open loop, since the metals are recovered for example in special alloys whereas the slag is typically intended to produce insulating materials such as rock wool.

hydrometallurgical ways, wherein the spent catalysts are subjected to a calcination followed by leaching, generally performed with strong solutions of acids and/or bases. The use of organic acids or of micro-organisms (bio-leaching) is also described.

Other techniques have been studied, implementing for example a sublimation of some metals such as molybdenum, a volatilisation or a dissolving of the metals for example in a chlorinated medium, a reduction coupled with a magnetic separation. These techniques remain hard to exploit at an industrial scale.

The patent application WO 2007/001921 describes a method for extracting and recovering nickel, cobalt, iron, tungsten, molybdenum and vanadium from an alumina-based material (such as a catalyst impregnated with hydrocarbons) comprising an oxidation of the metals in an atmosphere containing oxygen and the reaction of the oxidised metals with gaseous HCl to form volatile compounds comprising one or more chloride(s) and/or oxychloride(s). Handling of this type of particularly corrosive compounds requires very particular facilities, as well as considerable know-how and safety level.

The application WO 03/080878 describes a method for extracting nickel from a spent catalyst by leaching with sulphuric acid in the presence of a persulphate-based additive. Afterwards, the leaching liquor is treated to obtain a by-product containing a high content of alumina, and nickel sulphate or nickel hydroxide crystals. Afterwards, the nickel hydroxide is reduced to obtain the metal nickel or nickel oxide powder.

The application KR 20120128913 describes a method for recovering precious metals contained in wastes, by leaching by means of an aqueous solution of an organic acid.

SUMMARY OF THE INVENTION

The Applicant has now discovered a method that allows efficiently recycling the metals present in porous materials such as in particular traps and adsorbent agents. The method according to the invention allows extracting these metals in a selective manner, including when the material containing them is very highly contaminated, and depositing them again on another material wherein they will be reused.

Thus, an object of the present invention is a method for recycling a metal or several metals M selected from among those belonging to the columns 8 to 12 of the periodic table of elements, present at least partially in the form of metal sulphides in a porous material A which comprises at least one mineral oxide and has a sulphur content higher than or equal to 2% by weight. The method according to the invention comprises the following successive steps:

(1) at least one step of heat treatment of the material A in the presence of oxygen, at a temperature comprised within the range from 350° C. to 900° C.;

(2) at least one step of washing the material A' derived from step (1) by means of an aqueous solvent;

(3) at least one step of extracting the metal(s) M by setting the material A" derived from step (2) in contact with a solution S containing at least one carboxylic acid; and (4) at least one step of depositing at least one portion of the metal(s) M over a porous material B different from said material A, by setting the solution S' derived from step (3) in contact with said material B.

Thus, the invention allows recycling one metal or several metals M belonging to the columns 8 to 12 of the periodic table present on a porous material A based on a mineral oxide, contaminated by undesirable compounds including at least sulphur present in the form of metal sulphides and other sulphur compounds such as sulphur hydrocarbon. Typically, the material A is a trap or adsorbent agent which is spent after use thereof in a hydrocarbon processing unit.

The material B may be any porous material able to receive a deposit of the metal(s) M. Advantageously, the material B may be metal-free and in this case the invention allows, inter alia, preparing catalysts, traps and/or adsorbent agents, intended to be used in hydrocarbon treatment units. According to still advantageous alternative, the material B is a catalyst, a trap or an adsorbent agent which is in a new state or in a recycled (regenerated) state, and in this case the invention allows modifying the activity thereof.

The method according to the present invention is simple to implement, and does not require the use of toxic or corrosive agents. It allows reusing the metal(s) present in the spent starting material A efficiently. In addition, the metals are recycled in a catalytically active form, which allows on the one hand preparing new active materials like catalysts, traps and/or adsorbent agents, and on the other hand enhancing the activity of existing catalysts, traps and/or adsorbent agents.

The recycling rate of the metals can reach 50 to 75% by weight of the metals initially contained in the material A.

In addition, the solutions S containing one or more carboxylic acid(s) can be reused as such, without any additional purification treatment.

Other objects, features, aspects and advantages of the invention will appear more clearly upon reading the following description and examples.

Next, and unless stated otherwise, the bounds of a range of values are comprised within this range, in particular in the expression "comprised between" and "ranging from . . . to . . . ".

Moreover, the expressions "at least one" and "at least" used in the present description are respectively equivalent to the expressions "one or more" and "higher than or equal to".

DETAILED DESCRIPTION

The Starting Material A (Metal Donor Material)

The present invention applies to a starting material A, which is a material contaminated in particular by sulphur, and which contains one metal or several metals M that is/are to be selectively extracted in order to transfer it/them into a material B, which is typically a non-contaminated material intended to be used.

The metal or the metals M is/are selected from among those belonging to the columns 8 to 12 of the periodic table of elements. Reference is made herein to the version of the periodic table of elements as published by the IUPAC (International Union of Pure and Applied Chemistry).

In the starting material A, the metal or the metals M are present, all or in part, in the form of metal sulphides (i.e. sulphides of metals). In the case where the metal (the metals) M is/are not entirely in the form of metal sulphides, it/they may also be in the form of any other chemical species such as oxides of metals, elementary metal forms.

Preferably, the metal or the metals M is/are selected from among iron, cobalt, nickel, copper, and zinc and more preferably from among nickel, copper, and zinc.

According to a preferred embodiment, the material A contains one single metal M belonging to the columns 8 to 12 of the periodic table of elements. In this embodiment, the metal M is preferably nickel, copper, or zinc.

According to another preferred embodiment, the material A does not contain any metal belonging to the column 6 of the periodic table of elements.

The material A further contains one or more refractory mineral oxide(s), which may be selected in particular from among aluminas, silicas, silica-aluminas, zeolites, zirconas, titanium and boron oxides, and mixtures of such oxides. In the case where said mineral oxide(s) is/are metal oxide(s), it/they is/are selected from among oxides of metals not belonging to the columns 8 to 12 of the periodic table of elements.

Preferably, the material A contains one or more mineral oxide(s) selected from among aluminas, silicas, silica-aluminas, and more preferably aluminas.

The material A contains one or more metal(s) M in a content, expressed in the form of the ratio of the total weight of the oxide(s) of metals M to the total weight of said mineral oxide(s), advantageously comprised within the range of ratios typically from 0.2 to 5.5, preferably from 1 to 4. To measure this ratio, the mass of metals M present in the material A is expressed on the basis of the total equivalent amount of oxides of the corresponding metals.

The starting material A also contains sulphur, at a content of at least 2% by weight.

Advantageously, this content is expressed in weight of elementary sulphur (i.e. of the element S) relative to the weight of the material A having undergone a heat treatment at a temperature of 250° C. for 2 hours under nitrogen. In other words, the sulphur content of the starting material A is measured on the material obtained after treatment thereof for 2 h at a temperature of 250° C. under nitrogen, then cooling under nitrogen at room temperature.

In general, the starting material A is in the form of solid particles such as beads, cylindrical-shaped particles, extrudates, pastilles. It has a specific surface area, measured by the BET method, generally comprised between 50 and 250 $m^2/g$, a porous volume, determined by nitrogen adsorption, ranging from 0.2 to 0.8 ml/g, and an average pore diameter, determined by nitrogen adsorption, ranging from 10 to 40 nm.

The Material B (Metal Receiver Material)

The material B used in step (4) may be any porous material, different from the starting material A.

Advantageously, it comprises one or more refractory mineral oxide(s), which may be selected in particular from among aluminas, silicas, silica-aluminas, zeolites, zirconas, titanium and boron oxides, and mixtures of such oxides.

Preferably, the material B contains one or more mineral oxide(s) selected from among aluminas, silicas, silica-aluminas, and more preferably aluminas.

According to a first embodiment, the material B does not contains any metals. In this embodiment, the method according to the invention allows for example preparing new traps, adsorbents and catalysts from virgin inorganic oxide supports.

According to a second embodiment, the material B contains one metal or several metals M', which may be identical or different from said metals M. In particular, the metal (the metals) M' may be selected from among those belonging to the columns 6 to 12 of the periodic table of elements. When they are present, said metals M' are preferably in the form of metal oxides, or in an elementary form. In this embodiment, the method according to the invention allows in particular enhancing the effectiveness of traps, adsorbents and catalysts.

According to a preferred embodiment, the material B is sulphur-free. By sulphur-free, it should be understood that the sulphur content, expressed in the form of elementary sulphur S, is lower than 0.5% by weight relative to the weight of the material B.

Preferably, the material B is in the form of solid particles, such as beads, cylindrical-shaped particles, extrudates. It has a specific surface area, measured by the BET method, generally comprised between 50 and 300 m$^2$/g, a porous volume, determined by nitrogen adsorption, ranging from 0.2 to 1 ml/g, and an average pore diameter, determined by nitrogen adsorption, ranging from 7 to 40 nm.

Step (1)

Step (1) consists of a heat treatment of the starting material A in the presence of oxygen, at a temperature comprised within the range from 350° C. to 900° C.

This step aims to eliminate the volatile compounds (such as hydrocarbons, water) and the carbon compounds (including coke) present at the surface of the material A.

Preferably, this heat treatment step is performed at a temperature comprised within the range from 400 to 600° C., more preferably from 450 to 580° C. and still better from 480 to 570° C.

The temperature of this step can be controlled, in a manner known per se, for example by means of thermocouples properly disposed in the mass of the material A.

The first step is performed in the presence of oxygen, for example by means of a gas stream containing oxygen. For example, this gas may consist of air, pure or mixed with additional oxygen or with an inert gas, so as to increase or reduce the oxygen content of air. This gas may also consist of a mixture of oxygen and of an inert gas such as nitrogen, or other gaseous mixtures comprising oxygen.

Preferably, the oxygen content of the gas is controlled, so as to better control the temperature of step (1). This content may be fixed, or on the contrary vary over time during the first step.

The gas flow rate is also controlled so as to control the combustion.

This heat treatment step may comprise several phases, performed at different temperatures and/or in the presence of variable amounts of oxygen.

In general, the total duration of this first step depends on the amount of material A to be treated, the composition of the latter, the amount of volatile compounds present at its surface, and the operating conditions (temperature, oxygen content). This duration is even shorter as temperature is high. In general, it is comprised between 0.1 and 20 hours, preferably between 0.2 and 10 hours.

The material A after treatment in step (1) is denoted the material A'.

Step (2)

This step consists in washing the material A' derived from step (1) by means of an aqueous solvent. Such a washing consists in setting the surface of the material A' in contact with the aqueous solvent, and then eliminating said solvent.

By aqueous solvent, it should be understood any solvent containing water. Thus, besides water, the solvent may comprise any water-miscible organic solvent, which may be selected from example from among alcohols, polyols.

Any organic or inorganic additive may be added to the aqueous solvent.

According to a preferred embodiment, the aqueous solvent contains at least 50% by weight of water, preferably at least 75% by weight, and still better at least 90% by weight of water. More preferably, the solvent consists of water (water content higher than 99% by weight).

Advantageously, the aqueous solvent volume used at this step is larger than the total porous volume of the sample of the material A' to be treated. In particular, this volume may be comprised within the range from 2 to 20 times the total porous volume of the material sample A', preferably from 5 to 10 times said porous volume.

Step (2) may be performed at any suitable temperature, ranging for example from room temperature (20° C.) to 150° C. Preferably, this step is performed under light heating, i.e. at a temperature ranging from 25 to 100° C., preferably from 30 to 70° C.

During this step, it is advantageous to proceed with an intermixing of the material A' and of the aqueous solvent, so as to ensure an effective washing of the surface of the material.

This step may be performed continuously or discontinuously (a so-called "batch" mode), the discontinuous mode being preferred as it allows limiting the implemented amount of water.

This step may be carried out in any solid/liquid extractor type unit or industrial mixer (for example a conical or biconical mixer).

The material A' after treatment in step (1) is denoted the material A".

Step (3)

This step consists in extracting the metal(s) M by setting the material A" derived from step (2) in contact with a solution S containing at least one carboxylic acid. This step allows extracting the metals of the material A", by dissolving these in the form of salts of organic acids.

The solvent S comprises a solvent which may be selected from among water, organic solvents (in particular alcohols, polyols), and mixtures of water and organic solvents.

Preferably, the solution S contains at least 50% by weight of water, preferably at least 60% by weight of water, relative to the total weight of the solution S.

The carboxylic acid(s) present in the solution S may be carboxylic mono-acids, di-acids and tri-acids. Preferably, they comprise from 1 to 8 carbon atoms.

According to a preferred embodiment, the carboxylic acid(s) are selected from among acetic acid, citric acid, maleic acid, glycolic acid, and mixtures of these acids. Preferably, the carboxylic acid(s) are selected from among acetic acid, citric acid, and mixtures thereof.

The solution S contains a total content of carboxylic acids typically comprised within the range from 5 to 50% by weight, preferably from 10 to 30% by weight, relative to the total weight of the solution S.

Advantageously, the volume of the solution S used at step (3) is larger than the total porous volume of the sample of the material A" to be treated.

In particular, this volume may be comprised within the range from 2 to 50 times the total porous volume of the sample of the material A", preferably from 5 to 20 times said porous volume, and still better from 10 to 15 times said porous volume.

Step (3) may be performed at any suitable temperature, ranging for example from room temperature (20° C.) to 150° C. Preferably, this step is performed at hot temperature, i.e. at a temperature ranging from 50 to 130° C., preferably from 80 to 120° C.

During this step, it is advantageous to proceed with an intermixing of the material A" and of the solution S, so as to ensure an optimum contact of the solution with the surface of the material.

This step may be performed continuously or discontinuously ("batch" mode), in any suitable unit, for example in a solid/liquid extractor or industrial mixer (for example a conical or biconical mixer).

Upon completion of step (3), the solution S' containing salts of the metal (or of the metals) M is separated from the material A", by any suitable separation method, for example by filtering or by centrifugation.

Step (4)

During this step, the metal or the metals M present in the form of salts in the solution S' derived from step (3) are deposited over the porous material B. It is proceeded by setting the solution S' containing metal salts derived from step (3) in contact with said material B.

According to a preferred embodiment, step (4) is carried out by impregnation of the material B by means of said solution. One could proceed by dry impregnation (i.e. using a solution volume smaller than the porous volume of the material B), by saturation impregnation of the porous volume (i.e. using a solution volume larger than or equal to the porous volume of the material B), or by soaking the material B in a large excess of the solution S'.

This contact may be instantaneous or last up to a few days. Preferably, the solution S' is kept in contact with said material B for a time period ranging from 1 to 30 hours, preferably from 5 to 25 hours, and still better from 10 to 20 hours.

Step (4) may be carried out at a pressure ranging from atmospheric pressure to 5 bars, preferably at atmospheric pressure.

Step (4) may be performed at any suitable temperature, ranging for example from 10° C. to 50° C. Preferably, this step is performed at a temperature ranging from 10 to 30° C.

In general, step (4) should be carried out under conditions enabling the deposition of the largest possible amount of the metal M at the surface of the material B.

According to a preferred embodiment, step (4) is repeated once or several times (for example repeated up to 5 times), so as to increase the amount of the metal M deposited over the material B. In this embodiment, one could advantageously set the material B again in contact with the same solution S', or with a different solution $S_0'$, derived from the treatment by means of steps (1) to (3) of a starting material $A_0$ different from A, and which contains one metal or several metals $M_0'$ which may be identical or different from the metal or the metals M.

In the case where step (4) is repeated, it may be advantageous to proceed with an intermediate drying of the material B, as described hereinafter, before each reiteration of step (4).

Preferably, upon completion of the method according to the invention, the total amount of metal (metals) M deposited over the material B, expressed in the form of metal oxide, is at least 1% by weight relative to the final total weight of the material B. Preferably, this amount is comprised between 2 and 10% by weight.

The Other Additional Steps

Besides the steps (1) to (4) described hereinbefore, the method according to the invention may optionally comprise one or more additional step(s), performed before and/or after said steps, or interposed between these steps.

Thus, the method according to the invention may comprise, after step (4), a step of drying the material B, which may be performed at a temperature ranging from 80° C. to 300° C., preferably from 100° C. to 150° C. Drying may be performed in open air or in the presence of a gaseous stream of air, of an inert gas such as nitrogen, or any other suitable gas.

The method according to the invention may also optionally comprise, after step (4), a step of calcinating the material B, which may be performed at a temperature ranging from 300° C. to 500° C. Calcination may be performed in open air or in the presence of a gaseous stream of air, of an inert gas such as nitrogen, or any other suitable gas.

In the case where the method according to the invention already comprises a drying step, the calcination step (if there is one) is then performed thereafter.

Finally, the method according to the invention may include one or more final step(s) of activating the final material B, intended to activate the metal sites.

The examples hereinafter are given to illustrate the invention, and should be interpreted as a limitation of its scope.

EXAMPLES

Used Materials

The examples hereinafter have been made based on a donor material A1 which is a sulphur trap spent following use thereof in a hydrocarbon hydroprocessing unit. The material A1 is in the form of particles consisting of alumina and nickel (nickel being in part in the form of reduced and partially re-oxidised nickel and in part in the form of nickel sulphide). This material A1 has a total nickel content, expressed on the basis of the equivalent amount of nickel oxide NiO, such that the $NiO:Al_2O_3$ weight ratio is 3.2.

This spent trap A1 contains 1.7% by weight of carbon and 2.9% by weight of sulphur. These measurements have been performed by means of an analyser from the brand LECO model CS230, on the product A1 which has been beforehand heat treated in a vertical furnace at a temperature of 250° C. for 2 hours under nitrogen.

As a receiver material B1, a spent and regenerated hydrogenation catalyst, consisting of 41.8% of nickel oxide NiO and alumina has been used.

Sulphur Trapping Performance Assessment Tests

These tests allow assessing the capacity of a porous material to trap sulphur in a hydrocarbon feedstock, and are carried using two model sulphur organic compounds which are n-butyl mercaptan and thiophene.

The test consists in setting a solution of either one of these two compounds in contact with the material in a pressurised reactor, under specific conditions, and in determining the amount of sulphur trapped by the tested material.

Before each test, the material is activated for 4 hours under a hydrogen ($H_2$) stream at 450° C.

For the mercaptan trapping test, a test solution containing n-butyl mercaptan in a toluene/n-hexane mixture (50/50 by volume) is used. This solution has a sulphur content, expressed in the form of elementary sulphur S, of 1,000 ppm by weight relative to the total weight of the test solution.

For the thiophene trapping test, a test solution containing thiophene in a toluene/n-hexane mixture (50/50 by volume) is used. This solution has a sulphur content, expressed in the form of elementary sulphur S, of 1,000 ppm by weight relative to the total weight of the test solution.

The used reactor consists of two portions: a cylinder made of Teflon (PTFE) provided with a lid and a metal reactor body (of the PARR 4749 type) which allow ensuring sealing and maintenance of pressure within the reactor.

The reactor is filled as follows: the PTFE cylinder and its lid are weighted, then filled with 15 mL of a test solution of one of the two sulphur organic compounds.

In the case of the mercaptan trapping test, 0.05 g of a tested porous material are added, under an inert atmosphere, in the reactor.

In the case of the thiophene trapping test, 0.5 g of a tested porous material are added, under an inert atmosphere, in the reactor.

The PTFE cylinder is then closed by means of its lid, and placed in the metal reactor. The latter is hermetically closed and placed in a thermostated container at 185° C. for 17 h.

The reactor is then cooled down to room temperature before opening thereof under an inert atmosphere. The PTFE cylinder and its lid are weighted, then a liquid sample is collected for analysis, with an Antek 9000 type sulphur content analyser.

The difference in the sulphur content of the solution after the test in comparison with the sulphur content before the test allows calculating the amount of sulphur trapped by the porous material. This amount is expressed in % by weight of trapped sulphur, in comparison with the weight of the porous material.

Comparative Example 1

A first test of recycling nickel from the material A1 into the material B1 has been carried, by following a comparative protocol consisting of steps (1), (3) and (4) described hereinbelow.

Step (1)

The material A1 has been subjected to a heat treatment step, by maintaining it at a temperature of 550° C. for 2 h under air in a muffle furnace. Thus, the material A1' is obtained. This material contains 0.1% by weight of carbon and 2.8% by weight of sulphur. These contents have been measured with an analyser from the brand LECO, model CS230.

Step (3)

50 g of the material A1' have been placed in a rotary vial equipped with a mechanical stirrer, and a solution S1 obtained by mixing 103 g of water and 146.6 g of a solution at 50% by weight of citric acid in water has been added. The content of the vial has been stirred while being refluxed at a temperature of 100° C. for 2 hours.

After cooling, the mixture is filtered and a solution S1' (comprising the solution S1 and nickel salts) is thus recovered.

Step (4)

The solution S1 is then set in contact with the material B1, by proceeding with impregnation in a porous volume using 43.4 g of the solution S1' for 100 g of the material B1.

The mixture is left to age at room temperature for 16 hours.

Then, the material B1 is dried for 1.5 hours in a furnace at 130° C., and the impregnation in a porous volume is reiterated identically, with the same amount of the solution S1' for 16 hours.

Finally, the material is subjected to a final drying (1.5 hours in a furnace at 130° C.). The modified material obtained by the comparative method hereinbefore is denoted $B1_C$.

Determination of the Properties of the Material $B1_C$

Analysis of the nickel content (by X-ray fluorescence): the material $B1_C$ has a nickel oxide content of 46.8% by weight. Thus, the method including steps (1), (3) and (4) has allowed increasing the NiO content of the receiver material B1 from 41.8% to 46.8% by weight.

Sulphur trapping performances: the two sulphur trapping tests have been performed, on the original material B1, and on the material $B1_C$. The results are detailed in Table 1 hereinbelow.

TABLE 1

| Material | n-butyl mercaptan trapping test (% by weight of trapped S) | Thiophene trapping test (% by weight of trapped S) |
|---|---|---|
| B1 | 13.3 | 0.3 |
| $B1_C$ | 13.1 | 0.2 |

The results show that, although it has a higher nickel content than the starting material B1, the material modified according to the comparative method still has a slightly reduced activity in comparison with the material B1.

Example 2 According to the Invention

A second test of recycling nickel from the material A1 into the material B1 has been carried out, following a protocol in accordance with the invention, consisting of the following steps (1), (2), (3) and (4):

steps (1), (3) and (4) are strictly identical to those of Example 1 hereinbefore;

between steps (1) and (3), a step (2) described hereinbelow is inserted.

Step (2)

50 g of the material A1' have been placed in a rotary vial equipped with a mechanical stirrer, then 100 ml of demineralised water have been added. The content of the vial has been stirred at a temperature of 50° C. for 2 hours.

After cooling at room temperature, the water has been eliminated by filtering and the material A1" thus recovered has been placed again in the vial for the implementation of step (3).

The material obtained upon completion of step (4) after final drying is denoted $B1_{I-1}$.

Determination of the Properties of the Material $B1_{I-1}$

Analysis of the nickel content (by X-ray fluorescence): the material $B1_{I-1}$ has a nickel oxide content of 46.5% by weight. Thus, the method according to the invention including steps (1), (2), (3) and (4) has allowed increasing the NiO content of the receiver material B1 from 41.8% to 46.5% by weight.

Sulphur trapping performances: the two sulphur trapping tests have been performed, on the original material B1, and on the material $B1_{I-1}$. The results are detailed in Table 2 hereinbelow.

TABLE 2

| Material | n-butyl mercaptan trapping test (% by weight of trapped S) | Thiophene trapping test (% by weight of trapped S) |
|---|---|---|
| B1 | 13.3 | 0.3 |
| $B1_{I-1}$ | 15.5 | 0.5 |

The results show that the material modified in accordance with the method according to the present invention has a significantly higher activity than that of the original material B1.

Example 3 According to the Invention

A third test of recycling nickel from the material A1 into the material B1 has been carried out, following a protocol in accordance with the invention, consisting of the steps (1), (2), (3) and (4) described hereinbelow.

Step (1)

The material A1 has been subjected to a heat treatment step, by maintaining it at a temperature of 550° C. for 2 h under air in a muffle furnace. Thus, the material A1' is obtained. This material contains 0.1% by weight of carbon and 2.8% by weight of sulphur. These contents have been measured with a LECO CS230 analyser.

Step (2)

50 g of the material A1' have been placed in a rotary vial equipped with a mechanical stirrer, then 100 ml of demineralised water have been added. The content of the vial has been stirred at a temperature of 50° C. for 2 hours.

After cooling at room temperature, the water has been eliminated by filtering and the material A1" thus recovered has been placed again in the vial.

Step (3)

A solution S2 obtained by mixing 176 g of water and 22.8 g of acetic acid with a purity of 99% by weight in water has been added to the material A1" in the vial. The content of the vial has been stirred while being refluxed at a temperature of 100° C. for 2 hours.

After cooling, the mixture is filtered and a solution S2' (comprising the solution S2 and nickel salts) is thus recovered.

Step (4)

The solution S2 is then set in contact with the material B1, by proceeding with impregnation in a porous volume using 35.5 g of the solution S2' to impregnate 100 g of the material B1.

The mixture is left to age at room temperature for 16 hours.

Then, the material B1 is dried for 1.5 hours in a furnace at 130° C., and the impregnation in a porous volume is reiterated identically, with the same amount of the solution S2' for 16 hours.

Finally, the material is subjected to a final drying (1.5 hours in a furnace at 130° C.). The modified material obtained by the comparative method hereinbefore is denoted $B1_{I-2}$.

Determination of the Properties of the Material $B1_{I-2}$

Analysis of the nickel content (by X-ray fluorescence): the material $B1_{I-2}$ has a nickel oxide content of 45.4% by weight. Thus, the method according to the invention including steps (1), (2), (3) and (4) has allowed increasing the NiO content of the receiver material B1 from 41.8% to 45.4% by weight.

Sulphur trapping performances: the two sulphur trapping tests have been performed, on the original material B1, and on the material $B1_{I-2}$. The results are detailed in Table 3 hereinbelow.

TABLE 3

| Material | n-butyl mercaptan trapping test (% by weight of trapped S) | Thiophene trapping test (% by weight of trapped S) |
|---|---|---|
| B1 | 13.3 | 0.3 |
| $B1_{I-2}$ | 15.1 | 0.5 |

The results show that the material modified in accordance with the method according to the present invention has a significantly higher activity than that of the original material B1.

The invention claimed is:

1. A method for recycling a metal or several metals M selected from among those belonging to the columns 8 to 12 of the periodic table of elements, present at least partially in the form of metal sulphides in a porous material A which comprises at least one mineral oxide and has a sulphur content higher than or equal to 2% by weight, characterised in that it comprises the following successive steps:

(1) at least one step of heat treatment of the material A in the presence of oxygen, at a temperature comprised within the range from 350° C. to 900° C.;

(2) at least one step of washing the material A' derived from step (1) by means of an aqueous solvent;

(3) at least one step of extracting the metal(s) M by setting the material A" derived from step (2) in contact with a solution S containing at least one carboxylic acid; and (4) at least one step of depositing at least one portion of the metal(s) M over a porous material B different from said material A, by setting the solution S' derived from step (3) in contact with said material B.

2. The method according to claim 1, characterised in that the metal or the metals M are selected from the group consisting of iron, cobalt, nickel, copper, and zinc.

3. The method according to claim 2, characterised in that the material A contains one single metal M selected from the group consisting of nickel, copper, or zinc.

4. The method according to claim 1, characterised in that the material A contains one single metal M belonging to the columns 8 to 12 of the periodic table of elements.

5. The method according to claim 1, characterised in that the material B contains one or more refractory mineral oxide(s), selected from the group consisting of aluminas, silicas, silica-aluminas, zeolites, zirconas, titanium and boron oxides, and mixtures of such oxides.

6. The method according to claim 1, characterised in that the heat treatment step (1) is performed at a temperature comprised within the range from 400 to 600° C.

7. The method according to claim 1, characterised in that the aqueous solvent used at the washing step (2) contains at least 50% by weight of water.

8. The method according to claim 1, characterised in that the washing step (2) is performed at a temperature ranging from 20° C. to 150° C.

9. The method according to claim 1, characterised in that the carboxylic acid(s) present in the solution S used at step (3) are selected from the group consisting of carboxylic mono-acids, di-acids and tri-acids.

10. The method according to claim 9, characterised in that the carboxylic acid(s) are selected from the group consisting of acetic acid, citric acid, maleic acid, glycolic acid.

11. The method according to claim 9, characterised in that the carboxylic acid(s) are selected from the group consisting of acetic acid, citric acid, and mixtures thereof.

12. The method according to claim 1, characterised in that the solution S contains a total content of carboxylic acids comprised within the range from 5 to 50% by weight, relative to the total weight of the solution S.

13. The method according to claim 1, characterised in that step (3) is performed at a temperature ranging from 20° C. to 150° C.

14. The method according to claim 1, characterised in that step (4) is carried out by impregnation of the material B by means of the solution S' by proceeding by dry impregnation, by saturation impregnation of the porous volume, or by soaking the material B in a large excess of the solution S'.

15. The method according to claim 1, characterised in that during step (4), the solution S' is kept in contact with said material B for a period ranging from 1 to 30 hours.

16. The method according to claim 1, characterised in that step (4) is repeated by setting the material B in contact either with the same solution S', or with a different solution S0' derived from the treatment by means of steps (1) to (3) of a starting material A0 which is different from A and which contains a metal or several metals M0' which may be identical to or different from the metal or metals M.

17. The method according to claim 1, characterised in that it comprises, after step (4), a step of drying the material B, performed at a temperature ranging from 80° C. to 300° C.

* * * * *